US012604276B2

(12) United States Patent
Huang et al.

(10) Patent No.: US 12,604,276 B2
(45) Date of Patent: Apr. 14, 2026

(54) USER EQUIPMENT (UE) CAPABILITY SIGNALING FOR MAXIMUM POWER SUPPORT

(71) Applicant: QUALCOMM INCORPORATED, San Diego, CA (US)

(72) Inventors: Yi Huang, San Diego, CA (US); Gokul Sridharan, Sunnyvale, CA (US); Wanshi Chen, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/948,833

(22) Filed: Oct. 1, 2020

(65) Prior Publication Data

US 2021/0105724 A1 Apr. 8, 2021

Related U.S. Application Data

(60) Provisional application No. 62/911,203, filed on Oct. 4, 2019.

(51) Int. Cl.
| | |
|---|---|
| *H04W 52/14* | (2009.01) |
| *H04B 7/0456* | (2017.01) |
| *H04B 7/06* | (2006.01) |
| *H04W 8/24* | (2009.01) |
| *H04W 52/36* | (2009.01) |
| *H04W 72/21* | (2023.01) |

(52) U.S. Cl.
CPC ........ *H04W 52/146* (2013.01); *H04B 7/0456* (2013.01); *H04B 7/0639* (2013.01); *H04W 8/24* (2013.01); *H04W 52/365* (2013.01); *H04W 52/367* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 9,071,412 | B2 * | 6/2015 | Tiirola | H04B 7/0456 |
| 9,831,927 | B2 * | 11/2017 | Tiirola | H04L 5/0091 |
| 10,476,567 | B2 * | 11/2019 | Wernersson | H04L 5/0048 |
| 11,096,219 | B2 * | 8/2021 | Huang | H04B 7/0695 |
| 11,139,864 | B2 * | 10/2021 | Petersson | H04L 5/005 |
| 2011/0199921 | A1 | 8/2011 | Damnjanovic et al. | |
| 2012/0057491 | A1 * | 3/2012 | Tiirola | H04W 72/23 |
| | | | | 370/252 |

(Continued)

FOREIGN PATENT DOCUMENTS

WO 2019062681 A1 4/2019

OTHER PUBLICATIONS

U.S. Appl. No. 62/887,539 dated Aug. 15, 2019, Wang et al., "Signaling Transmission for Uplink Full Power Transmission in NR", p. 1-78.*

(Continued)

*Primary Examiner* — Gregory B Sefcheck
(74) *Attorney, Agent, or Firm* — Harrity & Harrity, LLP

(57) ABSTRACT

Wireless communications systems and methods related to wireless communications in a system are provided. A user equipment (UE) may transmit to a base station (BS), an indication of a maximum transmit power capability of the UE. The UE may receive from the BS, a transmit precoding configuration based on the UE's maximum transmit power capability. Additionally, the UE may transmit to the BS, a communication signal using the transmit precoding configuration.

24 Claims, 10 Drawing Sheets

(56) References Cited

U.S. PATENT DOCUMENTS

| | | | | |
|---|---|---|---|---|
| 2013/0121264 A1 | 5/2013 | Heo et al. | | |
| 2013/0223406 A1 | 8/2013 | Vujcic | | |
| 2014/0071952 A1* | 3/2014 | Kim | H04L 5/0053 | |
| | | | | 370/335 |
| 2015/0256236 A1* | 9/2015 | Tiirola | H04B 7/0408 | |
| | | | | 375/267 |
| 2017/0195100 A1 | 7/2017 | Kim et al. | | |
| 2018/0062724 A1* | 3/2018 | Onggosanusi | H04B 7/0421 | |
| 2018/0368083 A1* | 12/2018 | Yang | H04B 7/0486 | |
| 2019/0081671 A1* | 3/2019 | Yang | H04B 7/0482 | |
| 2019/0082448 A1* | 3/2019 | Nogami | H04L 5/0053 | |
| 2019/0149365 A1* | 5/2019 | Chatterjee | H04W 76/11 | |
| | | | | 370/329 |
| 2019/0182001 A1* | 6/2019 | Lee | H04W 72/21 | |
| 2020/0053724 A1* | 2/2020 | MolavianJazi | H04L 5/0048 | |
| 2020/0154364 A1* | 5/2020 | Rahman | H04W 72/0473 | |
| 2020/0169958 A1* | 5/2020 | Lee | H04W 52/146 | |
| 2020/0275416 A1* | 8/2020 | Haghighat | H04B 7/0628 | |
| 2020/0336998 A1* | 10/2020 | Rahman | H04W 8/24 | |
| 2020/0367217 A1* | 11/2020 | Wang | H04L 5/0094 | |
| 2020/0374911 A1* | 11/2020 | Lee | H04L 5/0007 | |
| 2020/0382180 A1* | 12/2020 | Wang | H04L 5/0053 | |
| 2020/0382181 A1* | 12/2020 | Wang | H04B 7/0465 | |
| 2020/0383062 A1* | 12/2020 | Wang | H04L 25/0226 | |
| 2020/0395981 A1* | 12/2020 | Petersson | H04B 7/0697 | |
| 2021/0051608 A1* | 2/2021 | Sridharan | H04B 7/0465 | |
| 2021/0092720 A1* | 3/2021 | Haghighat | H04B 7/0628 | |
| 2021/0143874 A1* | 5/2021 | Park | H04B 7/0695 | |
| 2021/0153143 A1* | 5/2021 | Sridharan | H04W 72/23 | |
| 2021/0345253 A1* | 11/2021 | Matsumura | H04B 7/0639 | |
| 2021/0352596 A1* | 11/2021 | Liu | H04W 52/146 | |
| 2021/0399773 A1* | 12/2021 | Huang | H04B 17/364 | |
| 2022/0014252 A1* | 1/2022 | Harrison | H04B 7/0617 | |
| 2022/0015039 A1* | 1/2022 | Huang | H04W 52/367 | |
| 2022/0078825 A1* | 3/2022 | Davydov | H04B 7/0639 | |
| 2022/0109474 A1* | 4/2022 | Haghighat | H04B 7/0626 | |
| 2022/0166586 A1* | 5/2022 | Kundu | H04L 27/0006 | |
| 2022/0286174 A1* | 9/2022 | Okamura | H04B 7/0456 | |
| 2022/0353039 A1* | 11/2022 | Okamura | H04W 52/146 | |
| 2024/0114468 A1* | 4/2024 | Huang | H04W 52/346 | |

OTHER PUBLICATIONS

U.S. Appl. No. 62/888,088 dated Aug. 16, 2019, Wang et al., "Signaling Transmission for Uplink Full Power Transmission in NR", p. 1-78.*

U.S. Appl. No. 62/520,467, filed Jun. 15, 2017, Park et al., "Linear Combination Codebook for Uplink", i.e. Fig. 2-1.*

U.S. Appl. No. 62/743,577, filed Oct. 10, 2018, Harrison et al., "Full Power UL MIMO via Multiple SRS Resource Groups", paragraph 33.*

International Search Report and Written Opinion—PCT/US2020/053877—ISA/EPO—Jan. 13, 2021.

Qualcomm Incorporated: "Full Tx Power for UL Transmissions", 3GPP Draft, 3GPP TSG RAN WG1 #98, R1-1909274 Full Tx Power for UL Transmissions, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Aug. 17, 2019 (Aug. 17, 2019), XP051765879, pp. 1-11, Retrieved from the Internet: URL: http://www.3gpp.org/ftp/tsg_ran/WG1_RL1/TSGR1_98/Docs/R1-1909274.zip [retrieved on Aug. 17, 2019] sections 2, 6.7.

VIVO: "Feature Lead Summary on Full Tx Power UL Transmission", 3GPP Draft, 3GPP TSG RAN WG1#98, R1-1909477 Summary on MIMO 7 2 84 Full Tx Power UL Transmission, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Sep. 3, 2019 (Sep. 3, 2019), XP051766079, 25 pages, Retrieved from the Internet: URL: http://www.3gpp.org/ftp/tsg_ran/WG1_RL1/TSGR1_98/Docs/R1-1909477.zip., sections 1-3.

VIVO: "Summary of Offline Discussion on UL Full Tx", 3GPP Draft, 3GPP TSG RAN WG1#98, R1-1909570 Summary of Offline Discussion on UL Full Tx, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Sep. 3, 2019 (Sep. 3, 2019), XP051766168, 15 pages, Retrieved from the Internet: http://www.3gpp.org/ftp/tsg_ran/WG1_RL1/TSGR1_98/Docs/R1-1909570.zip [retrieved on Sep. 2, 2019] sections 2.1.1, 2.1.2.

Taiwan Search Report—TW109134443—TIPO—Apr. 16, 2024.

VIVO: "Feature Lead Summary on Full TX Power UL Transmission", 3GPP TSG RAN WG1#98, R1-1909477, Prague, CZ, Aug. 26-30, 2019, 25 Pages.

VIVO: "Summary of Offline Discussion on UL full Tx", 3GPP TSG RAN WG1#98, R1-1909570, Prague, CZ, Aug. 26-30, 2019, 15 Pages.

Samsung: "View on full power UL transmission", 3GPP TSG RAN WG1 #98, R1-1908503, Prague, CZ, Aug. 26 30, 2019, Aug. 17, 2019, 9 Pages.

* cited by examiner

215

Precoding matrix $W$ for single-layer transmission using four antenna ports with transform precoding disabled.

| TPMI index | $W$ (ordered from left to right in increasing order of TPMI index) | | | | | | | |
|---|---|---|---|---|---|---|---|---|
| 302 0 – 7 | $\frac{1}{2}\begin{bmatrix}1\\0\\1\\0\end{bmatrix}$ | $\frac{1}{2}\begin{bmatrix}0\\1\\0\\1\end{bmatrix}$ | $\frac{1}{2}\begin{bmatrix}1\\0\\-1\\0\end{bmatrix}$ | $\frac{1}{2}\begin{bmatrix}0\\1\\0\\-1\end{bmatrix}$ | $\frac{1}{2}\begin{bmatrix}1\\0\\j\\0\end{bmatrix}$ | $\frac{1}{2}\begin{bmatrix}0\\1\\0\\j\end{bmatrix}$ | $\frac{1}{2}\begin{bmatrix}1\\0\\-j\\0\end{bmatrix}$ | $\frac{1}{2}\begin{bmatrix}0\\1\\0\\-j\end{bmatrix}$ |
| 306 8 – 15 | $\frac{1}{2}\begin{bmatrix}1\\1\\1\\j\end{bmatrix}$ | $\frac{1}{2}\begin{bmatrix}0\\1\\0\\-1\end{bmatrix}$ | $\frac{1}{2}\begin{bmatrix}0\\1\\0\\-j\end{bmatrix}$ | $\frac{1}{2}\begin{bmatrix}1\\1\\-1\\-1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\-1\\-1\\1\end{bmatrix}$ | $\frac{1}{2}\begin{bmatrix}1\\-1\\1\\-1\end{bmatrix}$ | $\frac{1}{2}\begin{bmatrix}1\\-1\\-j\\j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | | | | |

Precoding matrix $W$ for single-layer transmission using four antenna ports with transform precoding enabled.

| TPMI index | $W$ (ordered from left to right in increasing order of TPMI index) | | | | | | | |
|---|---|---|---|---|---|---|---|---|
| 402 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 406 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 410 16 – 23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | | | | |

404   408

USER EQUIPMENT 500

Processor 502

MEMORY 504

Instructions 506

Capability Indication Module 508

Precoding Configuration Module 509

Transceiver 510

Modem 512

RF Unit 514

Antennas 516

900

Transmit, by a user equipment (UE) to a base station (BS), an indication of a maximum transmit power capability of the UE    ~ 910

Receive, by the UE from the BS, a transmit precoding configuration based on the UE's maximum transmit power capability    ~ 920

Transmit, by the UE to the BS, a communication signal using the transmit precoding configuration    ~ 930

1000

Receive, by a base station (BS) from a user equipment (UE), an indication of a maximum transmit power capability of the UE          ~1010

Transmit, by the BS to the UE, a transmit precoding configuration based on the UE's maximum transmit power capability          ~1020

Receive, by the BS from the UE, a communication signal using the transmit precoding configuration          ~1030

USER EQUIPMENT (UE) CAPABILITY SIGNALING FOR MAXIMUM POWER SUPPORT

CROSS REFERENCE TO RELATED APPLICATIONS

The present application claims priority to and the benefit of the U.S. Provisional Patent Application No. 62/911,203, filed Oct. 4, 2019, the disclosure of each of which is hereby incorporated by reference in its entirety

TECHNICAL FIELD

This application relates to wireless communication systems, and more particularly to UE capability signaling for full power support.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

The mobility of a UE may allow the UE to easily move away from a serving BS. As the UE's distance from the serving BS increases, it may be desirable to use more of the power at the UE's disposal to transmit clear signals to the BS. If the UE transmits a signal that is not received by the BS (e.g., due to interference), a call or data may drop and not reach the BS. If a UE is located near an edge of a coverage area served by the BS, it may be desirable for the UE to transmit at an increased or full power level to establish/maintain a connection and exchange data with the BS.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes transmitting, by a user equipment (UE) to a base station (BS), an indication of a maximum transmit power capability of the UE; receiving, by the UE from the BS, a transmit precoding configuration based on the maximum transmit power capability of the UE; and transmitting, by the UE to the BS, a communication signal using the transmit precoding configuration.

In an aspect of the disclosure, a user equipment (UE) (e.g., an apparatus of wireless communication) includes a transceiver configured to: transmit, to a BS, an indication of a maximum transmit power capability of the UE; receive, from the BS, a transmit precoding configuration based on the maximum transmit power capability of the UE; and transmit, to the BS, a communication signal using the transmit precoding configuration.

In an aspect of the disclosure, a method of wireless communication includes receiving, by a BS from a UE, an indication of a maximum transmit power capability of the UE; transmitting, by the BS to the UE, a transmit precoding configuration based on the maximum transmit power capability of the UE; and receiving, by the BS from the UE, a communication signal using the transmit precoding configuration.

In an aspect of the disclosure, a base station (BS) (e.g., an apparatus of wireless communication) includes a transceiver configured to: receive, from a UE, an indication of a maximum transmit power capability of the UE; transmit, to the UE, a transmit precoding configuration based on the maximum transmit power capability of the UE; and receive, from the UE, a communication signal using the transmit precoding configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3 is a table storing transmit precoding configurations for cyclic-prefix (CP)-orthogonal frequency division multiple access (OFDM) waveforms according to some aspects of the present disclosure.

FIG. 4 is a table storing transmit precoding configurations for discrete Fourier transform-spread (DFT-S)-OFDM waveforms according to some aspects of the present disclosure.

DETAILED DESCRIPTION

Figure 1:
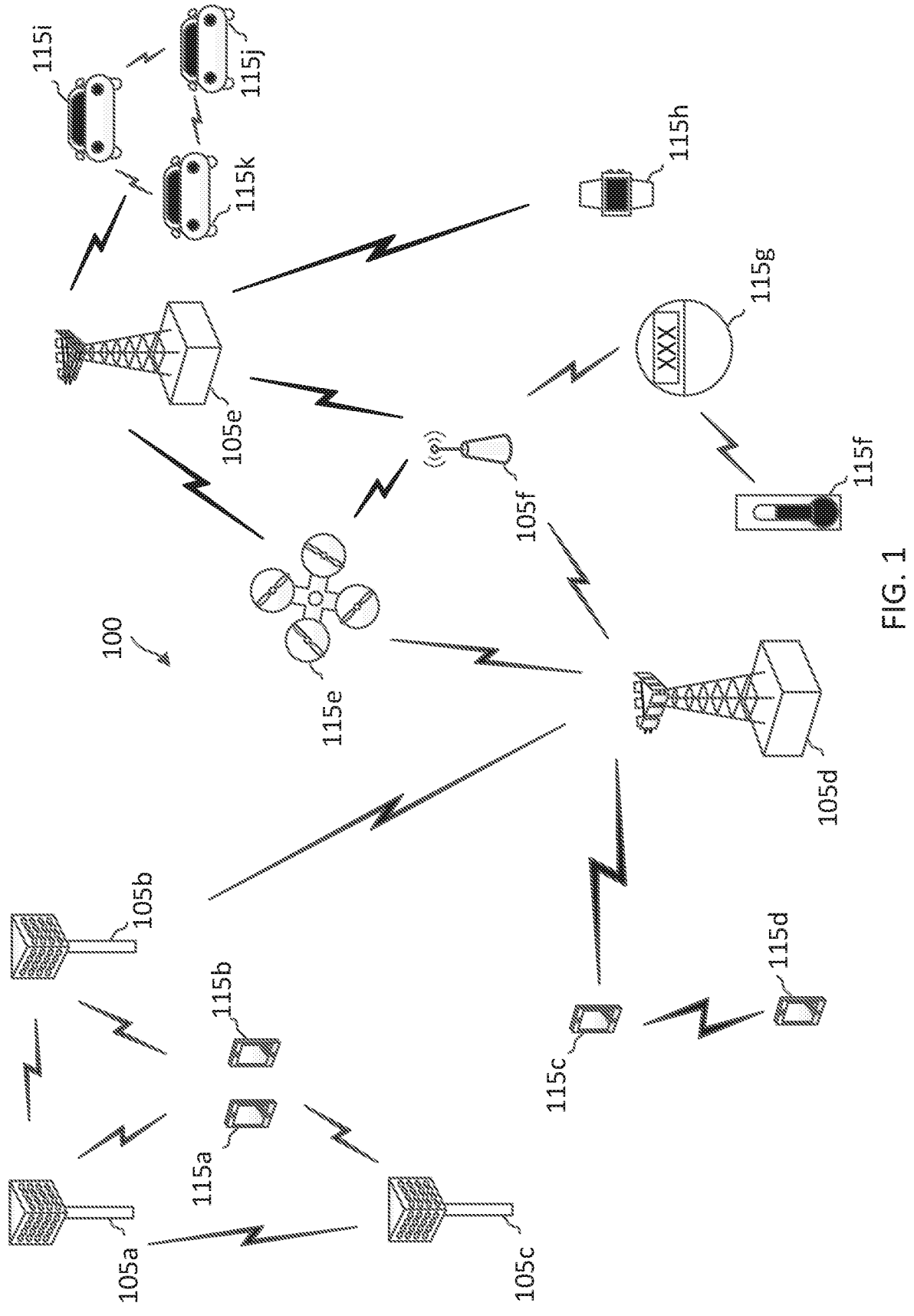
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

A UE may include one or more radio frequency (RF) chains, each RF chain can include a power amplifier that increases the output power. The maximum transmit power that any RF chain can support is governed, at least in part, by the power amplifier on that chain. Different combinations of RF chains may be used for transmitting an UL communication signal and may determine the maximum transmit power available for the UE. A UE may be fully coherent if each transmit chain included in the UE is capable of transmitting at full power. Transmission at full power may also be referred to as transmission at a maximum power. A UE may include multiple transmit chains coupled to multiple antennas located at various locations on the UE. A pair of transmit chains are coherent when the transmit chains can maintain the same relative phase during transmission. A pair of transmit chains are non-coherent when the transmit chains cannot maintain the same relative phase throughout transmissions. The transmit chains can be partially coherent when one pair of transmit chains may maintain the same relative phase and another pair of transmit chains may maintain the same relative phase, but the two pairs have different phases.

A UE having multiple antennas may be restricted from using all the available transmit power at their disposal. For example, the UE may have two antennas, and the BS may transmit a transmit precoding configuration indicating to the UE to use the second antenna, but not the first antenna, for an UL transmission. The transmit precoding configuration may be dependent on whether the UE is a transmit-coherent capable UE or a transmit-non-coherent UE. In some examples, the UE backs off the transmit power by a scaling factor for a reduced power transmission (e.g., ½) based on a configuration specified by a certain wireless communication standard. If the UE is located at an edge of a coverage area served by the BS, it may be desirable for the UE to transmit at a maximum transmit power when transmitting to the BS. In some instances, the UE may scale the linear value of the power by the ratio of the number of antennas with a non-zero PUSCH transmission power to the maximum number of antennas supported by the UE based on a configuration specified by a certain wireless communication standard. The UE may split the power equally across the antenna ports on which the UE transmits the PUSCH with non-zero power. Accordingly, when the UE transmits the UL communication signal using the second antenna, but not the first antenna, the UE may not transmit at full power. Additionally, it may be desirable for a partially coherent UE and/or a non-coherent UE to transmit at full power.

The present application describes mechanisms for UE capable signaling for full power support. In some examples, the UE transmits an indication of a maximum transmit power capability of the UE. The indication may indicate whether the UE is fully coherent, partially coherent, or non-coherent. If the UE is not fully coherent (e.g., partially coherent or non-coherent), the UE may transmit an indication indicating whether the UE supports one or more modes for enabling the UE to transmit at full power. A first mode may include the UE using a codebook subset and specifying a precoder to apply for the UL transmission, and a second mode may include the UE synthesizing a virtual port based on one or more antenna ports. More details of the first and second modes are discussed below. The BS can transmit a transmit precoding configuration based on the UE's maximum transmit power capability, and the UE transmits a communication signal based on the transmit precoding configuration. For example, in some instances the UE transmits the communication signal at a maximum transmit power based on the transmit precoding configuration.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform back-haul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical com-munications with ultra-reliable and redundant links for mis-sion critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communi-cating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the trans-mission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL sub-frame in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the commu-nications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control infor-mation may include resource assignments and protocol controls. Data may include protocol data and/or operational data. In some aspects, the BSs 105 and the UEs 115 may communicate using self-contained subframes. A self-con-tained subframe may include a portion for DL communica-tion and a portion for UL communication. A self-contained subframe can be DL-centric or UL-centric. A DL-centric subframe may include a longer duration for DL communi-cation than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OS. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

Figure 2:
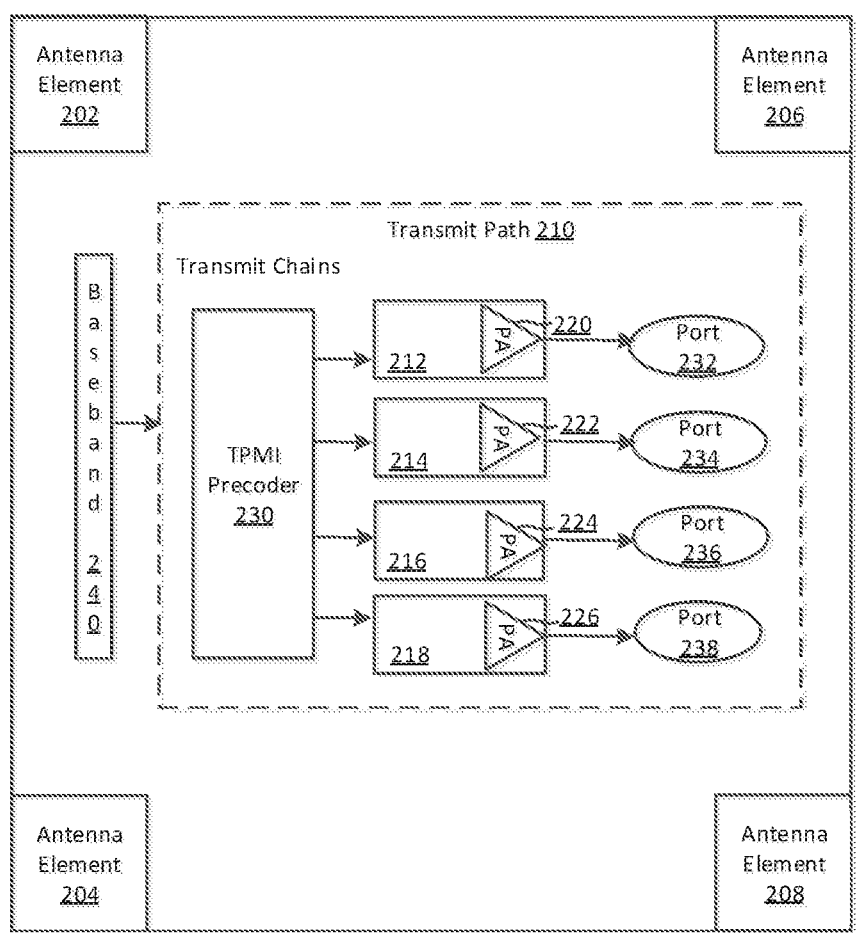
FIG. 2 illustrates an example of a user equipment (UE) according to some aspects of the present disclosure.

FIG. 2 illustrates an example of a UE 215 according to some aspects of the present disclosure. The UE 215 may be similar to the UEs 115 in FIG. 1 in the network 100. The UE 215 includes antenna elements 202, 204, 206, and 208. An antenna element may also be referred to as an antenna, an antenna port, or a port. Although the UE 215 is illustrated as having four antenna elements, it should be understood that in other examples, the UE 215 may include fewer antenna elements (e.g., 1, 2, or 3) or more antenna elements (e.g., 5, 6, 7, 8, etc.). A communication channel between a pair of nodes (e.g., a BS and a UE) includes not only the physical channel, but also radio frequency (RF) transceiver chains, for example, including antennas, low-noise amplifiers (LNAs), mixers, RF filters, and analog-to-digital (A/D) converters, and in-phase quadrature-phase (I/Q) imbalances, which may be different between different nodes and/or different antennas.

In the example illustrated in FIG. 2, the antenna elements 202, 204, 206, and 208 are located on different edges of the UE 215, thus creating diversity and providing for directional communication. The UE 215 may use at least one of the antenna elements 202, 204, 206, and/or 208 to transmit communication signals (e.g., SRS signals) to enable a BS (e.g., BS 105) to estimate an UL channel. The UE 215 includes a baseband 240 and a transmit path 210 for UL transmissions using one or more antenna elements. The baseband 240 may perform data encoding, cyclic-prefix (CP)-OFDM and/or discrete Fourier transform-spread-fast Fourier transform (DFT-s-FFT) modulation to generate a baseband signal. The transmit path 210 includes four transmit chains 212, 214, 216, and 218. Although the UE 215 is illustrated as having four transmit chains, it should be understood that in other examples, the UE 215 may include fewer transmit chains (e.g., 1, 2, or 3) or more transmit chains (e.g., 5, 6, 7, 8, etc.).

Each transmit chain may include a digital-to-analog converter (DAC), a mixer, and a power amplifier that converts a baseband signal to a radio frequency (RF) signal for transmission. For example, transmit chain 212 includes a power amplifier 220, transmit chain 214 includes a power amplifier 222, transmit chain 216 includes a power amplifier 224, and transmit chain 218 includes a power amplifier 226. Additionally, RF chains may be routed to multiple antennas, including all of the antennas, through phase shifters and/or switches. A transmit chain may also refer to an RF chain.

The UE 215 may sound a port 232, 234, 236, and/or 238 by sending an SRS using a combination of transmit chains. The ports 232, 234, 3236, and/or 238 may or may not have a one-to-one mapping to the antenna elements 202, 204, 206, and/or 208. When there is a one-to-one mapping, each antenna element 202, 204, 206, and/or 208 may map to one of the ports 232, 234, 236, and/or 238. When the ports 232, 234, 236, and/or 238 are logical ports or virtual ports, the UE may configure the transmit chains differently for different ports to produce signals with different powers and/or different direction. The UE can report a composite of the signals from the transmit chains to the BS as a virtual port by applying a transmit precoding matrix indicator (TPMI) precoder 230. Although the TPMI precoder 230 is illustrated in relation to the transmit chains, the TPMI precoder 230 may be applied in the baseband 240.

The use of a power amplifier may increase the output power of an RF chain. The maximum transmit power that any RF chain can support is governed by the power amplifier (s) on that chain. Different combinations of RF chains may be used for transmitting an UL communication signal and may determine the maximum transmit power of a UE, which may define a power class of the UE. For example, a maximum transmit power capability of a power class 3 UE is about 23 dBm (decibel-milliwatts)). Accordingly, the power class 3 UE delivers a total power of about 23 dBm when the UE transmits using full power.

In some instances, the network may support three levels of UE capability. The UE 215 may have the first level of UE capability if the UE 215 is fully coherent and each transmit chain is capable of transmitting at full power. A fully coherent UE is capable of maintaining a relative phase across all the antenna elements 202, 204, 206, and 208. Two antenna elements maintain a relative phase if the phases across these two antennas are locked and/or remain the same. Each of the antenna elements in a fully coherent UE may be driven by the same RF module that maintains a relative phase across each of them. Additionally, if a UE 215 is of the first level of UE capability, each transmit chain 212, 214, 216, and 218 is capable of transmitting at full power. In other words, each of the transmit chains has a full-rated power amplifier, and regardless of which transmit chain is used for transmitting a communication signal, the UE 215 can transmit at full power. For example, a power class 3 UE may have a maximum transmit power of about 23 dBm.

The UE 215 may have the second level of UE capability if the UE 215 is partially coherent and at least one transmit chain 212, 214, 216, and/or 218 is capable of transmitting at full power. In other words, each transmit chain of a subset of transmit chains has a full-rated power amplifier, and the UE 215 may transmit at full power (or not) depending on which combination of transmit chain(s) is/are used. A partially coherent UE is capable of maintaining a relative phase across multiple subsets of the antenna elements 202, 204, 206, and 208. In an example, the antenna elements 202 and 206 may be driven by a first common RF module that maintains a relative phase across these two antenna elements, and the pair of antenna elements 202 and 206 may be referred to as coherent antennas. Additionally, the antenna elements 204 and 208 may be driven by a second common RF module that maintains a relative phase across these two antenna elements, and the pair of antenna elements 204 and 208 may be referred to as coherent antennas. The antenna elements 202 and 206 may operate to some extent independent from the antenna elements 204 and 208 because these pairs are driven by different RF modules. The UE may be unable to maintain phase coherence across these two pairs.

The UE 215 may have the third level of UE capability and accordingly may be non-coherent and none of the transmit chains 212, 214, 216, and 218 is capable of transmitting at full power. In other words, none of the transmit chains has a full-rated power amplifier. In some examples, the maximum transmit power for each of power amplifiers 212 and 214 is 20 dBm and the UE synthesizes a virtual port using both the power amplifiers 212 and 214, the UE may transmit a communication signal using the virtual port at 23 dBm. A maximum transmit power capability of a power class 3 UE is 23 dBm. If the UE is a power class 3 UE, the UE may synthesize a virtual port that delivers the maximum transmit power for the UE. Additionally, a power class 2 UE allows for output power levels of 26 dBm, and a power class 1 UE allows for output power levels for 30 dBm. In some examples, a partially coherent or non-coherent UE may use precoding to transmit at full power, as will be discussed in more details below.

Two or more of the three levels of UE capability may be merged together, depending on the details as discussed in the present disclosure. The BS may configure the UE 215 to transmit a communication signal at full power by transmitting to the UE a transmit precoding configuration that enables partially coherent and non-coherent UEs to deliver maximum transmit power. The BS may determine the transmit precoding configuration based on the UE's transmit power capability and in accordance with a codebook. Full transmission power UL transmission with multiple power amplifiers can be supported at least for codebook-based UL transmission for non-coherent and/or partially coherent UEs. The UE 215 may transmit UL communication signals using the transmit precoding configuration at the maximum transmit power. The BS may configure the transform precoding by disabling or enabling it.

FIG. 3 is a table 300 storing transmit precoding configurations for CP-OFDM waveforms according to some aspects of the present disclosure. The table 300 may be used by a BS and/or a UE to employ similar mechanisms as in the methods 800, 900, and/or 1000, described below with respect to FIGS. 8, 9 and 10, respectively. The table 300 stores precoding matrix W for single-layer transmission using four antenna ports with transform precoding disabled. If the transform precoding is disabled, the transmitted waveform corresponds to CP-OFDM.

A transmit precoding configuration may refer to a transmit precoder matrix indicator (TPMI) index or a matrix W. The table 300 includes a "TPMI index" column and a "matrix W" column, and indicates a scaling factor for power transmission of ½. A TPMI index refers to a corresponding matrix in the table 300. The matrices are ordered from left to right in increasing order of TPMI index. Additionally, each value in a matrix corresponds to an antenna. For example, for matrix $$\begin{bmatrix} 1 \\ 0 \\ 0 \\ 0 \end{bmatrix},$$

the first number "0" in the matrix may correspond to antenna element 202, the second number "0" in the matrix may correspond to antenna element 204, the third number "0" in the matrix may correspond to antenna element 206, and the fourth number "0" in the matrix may correspond to antenna element 208. A first value (e.g., "0") in a matrix may indicate that the antenna corresponding to the value is not used for an UL transmission. A second value (e.g., "1") in a matrix may indicate that the antenna corresponding to the value should be used for an UL transmission.

The UE may receive the transmit precoding configuration from the BS. As an example, the transmit precoding configuration may be the TPMI index or may be the matrix corresponding to the TPMI index. If the UE receives a TPMI index as the transmit precoding configuration, the UE may identify the matrix corresponding to the TPMI index and determine which antennas to use based on the matrix. The UE may transmit a communication signal using the antennas corresponding to the second value ("1") in the matrix, but not using the antennas corresponding to the first value ("0") in the matrix. A fully coherent UE may use any of the transmit precoding configurations illustrated in the table 300.

A BS may configure a non-coherent UE, which does not have any coherent antennas, to transmit a communication signal using at most one antenna at a time (e.g., one antenna). Because non-coherent UEs cannot maintain a relative phase across antenna elements, the network 100 may impose restrictions on the precoders that these UEs can use. A transmit precoding configuration may indicate a precoder. For example, a non-coherent UE may transmit a communication signal using TPMI indexes 0, 1, 2, or 3 or one of their corresponding matrices W in FIG. 3. TPMI index 0, 1, 2, or 3 corresponds to the first four matrices W, respectively, as shown in a box 302. Typically, a non-coherent UE may transmit a communication signal using any of the four transmit precoding configurations illustrated in the box 302, but does not use the remaining transmit precoding configurations shown in the table 300. For example, the UE may be restricted from using a transmit precoding configuration indicating usage of more than one antenna element (e.g., using all four antenna elements 202, 204, 206, and 208) on an UL transmission because the UL transmission would cross non-coherent antennas. It may be desirable to remove this restriction from UL transmissions so that the non-coherent UE may transmit with as many antennas as is necessary for maximum transmit power. In some examples, if the UE transmits an indication to the BS that the UE is non-coherent, the BS may transmit a transmit precoding configuration that configures the UE to use more than one antenna element (e.g., 2, 3, 4, or more antenna elements) for UL transmissions for maximum transmit power.

A partially coherent UE may have a first pair of coherent antenna elements 204 and 208 and a second pair of coherent antennas 202 and 206. Because partially coherent UEs may maintain a relative phase across only a subset of antenna elements (e.g., antenna element 202 and 206), the network 100 may impose restrictions on the precoders that these UEs can use. A BS may configure a partially coherent UE, which may have two coherent antennas, to transmit a communication signal using at most two antennas at a time (e.g., one antenna or two antennas). If the first coherent pair corresponds to the first and third values in a matrix corresponding to a TPMI index, the UE may transmit the communication signal using TPMI indexes 4, 5, 6, or 7 and/or one of their corresponding matrices W. TPMI indexes 4-7 correspond to the first four matrices W, respectively, as shown in a box 304, and the values corresponding to the first and third antennas in the matrix are non-zero. If the second coherent pair corresponds to the second and fourth values in a matrix corresponding to a TPMI index, the UE may transmit the communication signal using TPMI indexes 8, 9, 10, or 11 and/or one of their corresponding matrices W. TPMI indexes 8-11 correspond to the first four matrices W, respectively, as shown in a box 306, and the values corresponding to the second and fourth antennas in the matrix are non-zero. Typically, a partially coherent UE may transmit a communication signal using any one of the twelve transmit precoding configurations illustrated in the boxes 302, 304, and 306, but does not use the remaining transmit precoding configurations shown in the table 300. For example, the UE may be restricted from transmitting a communication signal using a transmit precoding configuration indicating usage of more than two antenna elements (e.g., using all four antenna elements 202, 204, 206, and 208) because the UL transmission may cross a set of non-coherent antennas. It may be desirable to remove this restriction from UL transmissions so that the partially coherent UE may transmit with as many antennas as is necessary for maximum transmit power. In some examples, if the UE transmits an indication to the BS that the UE is partially coherent, the BS may transmit a transmit precoding configuration that configures the UE to use more than two antenna elements (e.g., 3, 4, or more antenna elements) for UL transmissions for maximum transmit power.

It may be desirable for non-coherent and partially coherent UEs to use additional codebook subsets for output of the CP-OFDM waveform at the maximum transmit power for the power class corresponding to the UE. Accordingly, the BS may expand the set of codebooks that the UE can use for UL transmissions to include transmit precoding configurations indicating usage of more than one antenna for non-coherent UEs and indicating usage of more than two antennas for partially coherent UEs. In some examples, in response to an indication that the UE is partially coherent or non-coherent, the BS may determine a transmit precoding configuration corresponding to the TPMI index 12, 13, 14, or 15 corresponding to the first four matrices W, respectively, as shown in a box 308. The BS may transmit the transmit precoding configuration, and the UE may transmit a communication signal using the TPMI index 12, 13, 14, or 15 or one of their corresponding matrices W in FIG. 3. The TPMI indexes 0-15 may be sufficient to cover a transmit precoding configuration based on the UE's maximum transmit power capability because the remaining twelve transmit precoding configurations (e.g., TPMI indexes 16-27) in table 300 can be obtained from the precoder(s) defined in the TPMI index 12, 13, 14, and/or 15 through phase rotations. Accordingly, for partially coherent UEs that are capable of supporting full power, the codebook subset may start from TPMI index 0 to TPMI index 15.

For rank-1 precoders with transform precoding disabled, it can be found that TPMI $\{16, 17, 18, 19\}$=TPMI=$\{12, 13, 14, 15\}*[1, j, 1, j]$, TPMI $\{20, 21, 22, 23\}$=TPMI=$\{12, 13, 14, 15\}*[1, -1, 1, -1]$, TPMI $\{24, 25, 26, 27\}$=TPMI=$\{12, 13, 14, 15\}*[1, -j, 1, -j]$. If the UE is a partially coherent UE, the UE may not be able to maintain the phase coherent between the antenna ports set $\{0, 2\}$ and set $\{1, 3\}$. In other words, TPMI set $\{16, 17, 18, 19\}$ may be the same as TMPI set $\{12, 13, 14, 15\}$ from a partial-coherent UE point of view. Therefore, including rank-1 TPMI=$\{12, 13, 14, 15\}$ may be sufficient for partial-coherent UE to enable rank-1 full power transmission with transform precoding disabled.

FIG. 4 is a table 400 storing transmit precoding configurations for DFT-S-OFDM waveforms according to some aspects of the present disclosure. The table 400 may be used by a BS and/or a UE to employ similar mechanisms as in the methods 800, 900, and/or 1000, described below with respect to FIGS. 8, 9 and 10, respectively. The table 400 stores precoding matrix W for single-layer transmission using four antenna ports with transform precoding enabled. If the transform precoding is enabled, the transmitted waveform corresponds to DFT-S-OFDM.

The table 400 includes a "TPMI index" column and a "matrix W" column, and indicates a scaling factor for power transmission of ½. A fully coherent UE may use any of the transmit precoding configurations illustrated in the table 400. A non-coherent UE may transmit a communication signal using TPMI indexes 0, 1, 2, or 3 or one of their corresponding matrices W, as shown in a box 402. The non-coherent UE may be restricted from applying a transmit precoding configuration indicating usage of more than one antenna element (e.g., TPMI indexes 4-27) to UL transmissions.

A partially coherent UE may transmit a communication signal using TPMI indexes 4, 5, 6, or 7 or one of their corresponding matrices W, as shown in a box 404. Additionally, the partially coherent UE may transmit a communication signal using TPMI indexes 8, 9, 10, and 11 or one of their corresponding matrices W, as shown in a box 406. The partially coherent UE may be restricted from applying a transmit precoding configuration indicating usage of more than two antenna elements (e.g., TPMI indexes 12-27).

It may be desirable for non-coherent and partially coherent UEs to use additional codebook subsets for output of the DFT-S-OFDM waveform at maximum transmit power for the power class corresponding to the UE. Accordingly, the BS may expand the set of codebooks that the UE can use for UL transmissions to include transmit precoding configurations indicating usage of more than one antenna for non-coherent UEs and indicating usage of more than two antennas for partially coherent UEs. In some examples, in response to an indication that the UE is partially coherent or non-coherent, the BS may determine a transmit precoding configuration corresponding to the TPMI index 12, 13, 14, or 15 corresponding to the first four matrices W, respectively, as shown in a box 408. In some examples, in response to an indication that the UE is partially coherent or non-coherent, the BS may determine a transmit precoding configuration corresponding to the TPMI index 16, 17, 18, or 19 corresponding to the first four matrices W, respectively, as shown in a box 410. The TPMI indexes 0-19 may be sufficient to cover a transmit precoding configuration based on the UE's maximum transmit power capability because the remaining eight transmit precoding configurations (e.g., TPMI indexes 20-27) in table 400 can be obtained from the precoder(s) defined in the TPMI index 12, 13, 14, 15, 16, 17, 18, and/or 19 through phase rotations.

For rank-1 precoders with transform precoding enabled, it can be found that TPMI $\{16, 17, 18, 19\}$=TPMI=$\{12, 13, 14, 15\}$*[1, j, 1, −j], TPMI $\{20, 21, 22, 23\}$=TPMI=$\{12, 13, 14, 15\}$*[1, −1, 1, −1], TPMI $\{24, 25, 26, 27\}$=TPMI=$\{12, 13, 14, 15\}$*[1, −j, 1, j]. Accordingly, including TPMI $\{12, 13, 14, 15\}$ may be insufficient, as TPMI $\{16, 17, 18, 19\}$ may provide or result in a different phase (+180 degrees) on coherent ports $\{1, 3\}$. In an example, TPMI $\{12, 13, 14, 15, 16, 17, 18, 19\}$=TPMI $\{20, 21, 22, 23, 24, 25, 26, 27\}$*[1, −1, 1, −1]. Therefore, including TPMI $\{12, 13, 14, 15, 16, 17, 18, 19\}$ is sufficient for partial-coherent UE to enable rank-1 full power transmission with transform precoding enabled.

Figure 5:
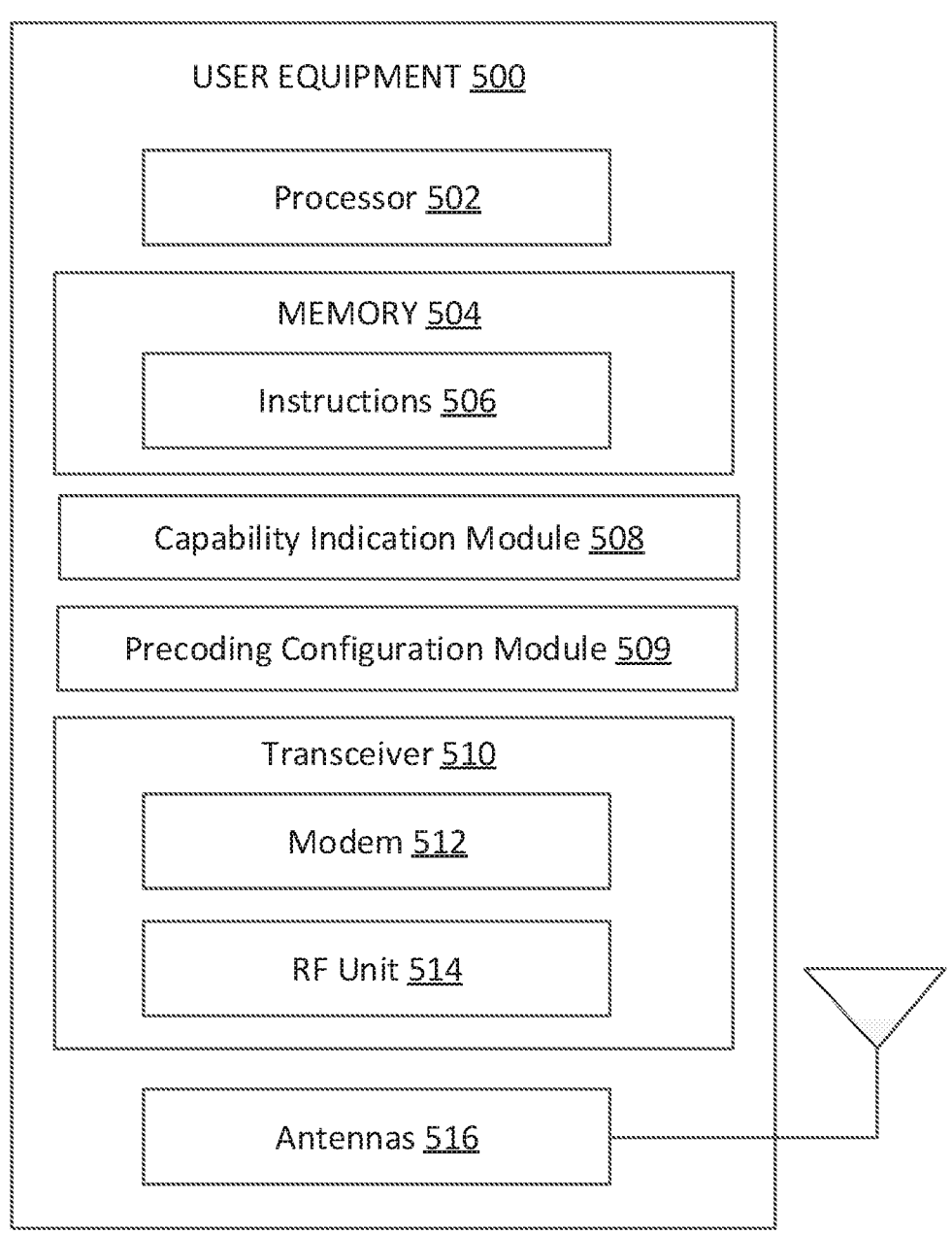
FIG. 5 is a block diagram of a UE according to some aspects of the present disclosure.

FIG. 5 is a block diagram of a UE 500 according to some aspects of the present disclosure. The UE 500 may be a UE 115 discussed above in FIG. 1 or a UE 215 discussed above in FIG. 2. As shown, the UE 500 may include a processor 502, a memory 504, a capability indication module 508, a precoding configuration module 509, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4 and 7-10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The capability indication module 508 and/or the precoding configuration module 509 may be implemented via hardware, software, or combinations thereof. The capability indication module 508 and/or the precoding configuration module 509 may be implemented as a processor, circuit, and/or instructions 506 stored in the memory 504 and executed by the processor 502. In some instances, the capability indication module 508 and/or the precoding configuration module 509 can be integrated within the modem subsystem 512. The capability indication module 508 and/or the precoding configuration module 509 can be implemented by a combination of software components (e.g., executed by a DSP or a general processor) and hardware components (e.g., logic gates and circuitry) within the modem subsystem 512. The capability indication module 508 and/or the precoding configuration module 509 may be used for various aspects of the present disclosure, for example, aspects of FIGS. 1-4 and 7-10.

In some aspects, the capability indication module 508 may be configured to transmit an indication of a maximum transmit power capability of the UE. In some examples, the indication may indicate whether the UE is fully coherent or not fully coherent (e.g., partially coherent or non-coherent) and whether all transmit chains (e.g., corresponding to the RF unit(s) 514) of the UE are capable of transmitting at full power, some transmit chains of the UE are capable of transmitting at full power, or no transmit chain can transmit at full power. The precoding configuration module 509 may be configured to receive a transmit precoding configuration based on the UE's maximum transmit power capability and coherency capability. The transmit precoding configuration may a TPMI index (e.g., TPMI index in FIG. 3 or in FIG. 4) or a matrix W corresponding to a TPMI index. The transmit precoding configuration may indicate to the UE which antennas to use for transmitting a communication signal. The precoding configuration module 509 may be configured to transmit a communication signal using the transmit precoding configuration.

As shown, the transceiver 510 may include the modem subsystem 512 and the RF unit 514. The transceiver 510 can be configured to communicate bi-directionally with other devices, such as the BSs 105 or BS 600. The modem subsystem 512 may be configured to modulate and/or encode the data from the memory 504, the capability indication module 508, and/or the precoding configuration module 509 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices. The RF unit 514 may correspond to the RF transmit chains included within a transmit chain, as discussed in the present disclosure.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., indication of the maximum transmit power capability or the transmit precoding configuration) to the capability indication module 508 and/or the precoding configuration module 509 for processing. The antennas 516 may include multiple antennas of similar or different designs in order to sustain multiple transmission links. The RF unit 514 may configure the antennas 516.

The antenna(s) 516 may correspond to the antenna element(s) or port(s) discussed in the present disclosure. The UE may determine, based on the transmit precoding configuration, a set of antennas to use for transmitting a communication signal. The UE may also determine, based on the transmit precoding configuration, a set of antennas to not use for transmitting the communication signal. The UE may transmit the communication signal at the maximum transmit power.

In some aspects, the transceiver 510 is configured to transmit an indication of a maximum transmit power capability of the UE, receive a transmit precoding configuration, and/or transmit a communication signal using the transmit precoding configuration, by coordinating with the capability indication module 508 and/or the precoding configuration module 509. In some aspects, the UE 500 can include multiple transceivers 510 implementing different radio access technologies (RATs) (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
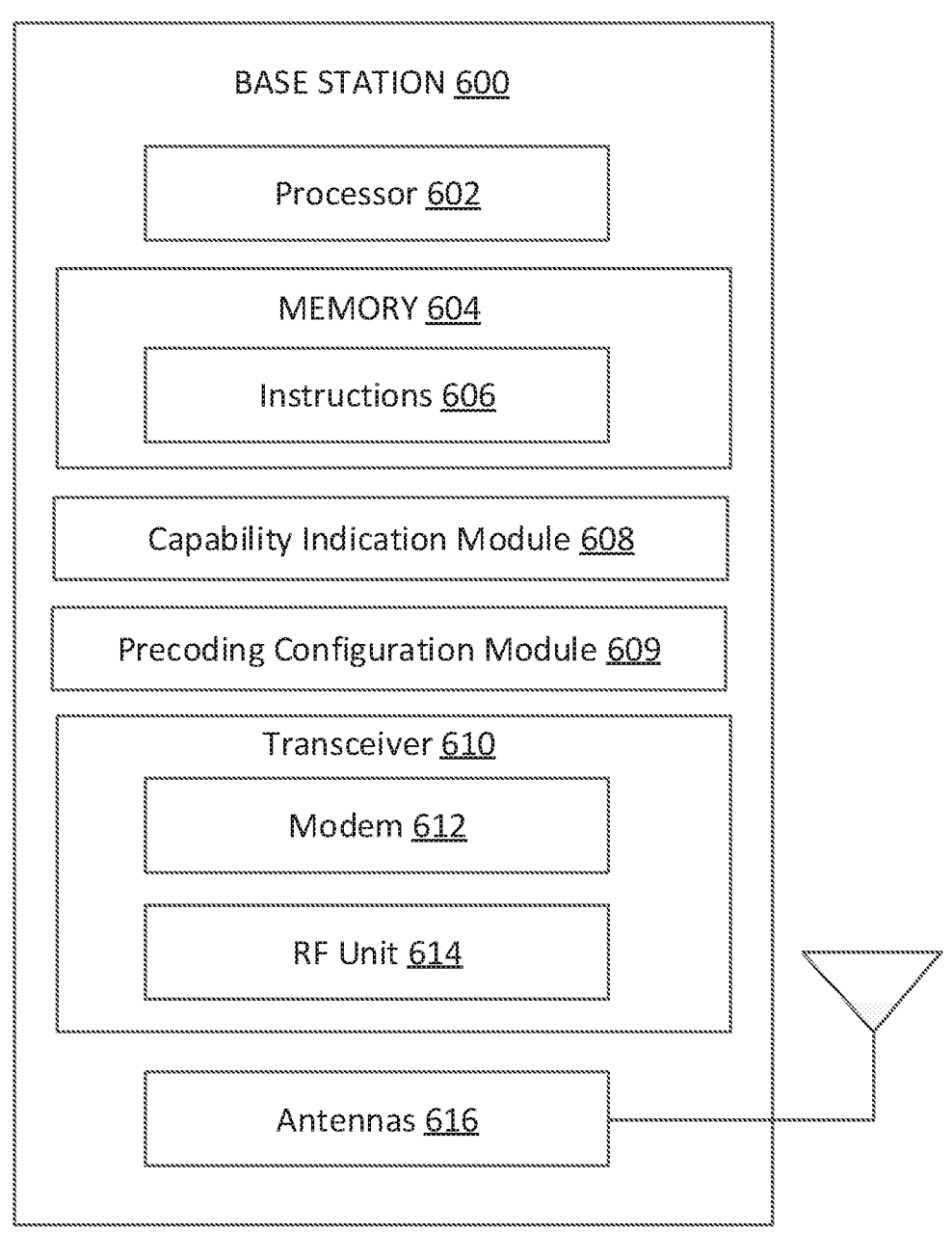
FIG. 6 is a block diagram of a base station (BS) according to some aspects of the present disclosure.

FIG. 6 is a block diagram of a BS 600 according to some aspects of the present disclosure. The BS 600 may be a BS 105 as discussed above in FIG. 1. As shown, the BS 600 may include a processor 602, a memory 604, a capability indication module 608, a precoding configuration module 609, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1, 3, 4, and 7-10. Instructions 606 may also be referred to as code, which may be interpreted broadly to include any type of computer-readable statement(s) as discussed above with respect to FIG. 5.

The capability indication module 608 and/or the precoding configuration module 609 may be implemented via hardware, software, or combinations thereof. The capability indication module 608 and/or the precoding configuration module 609 may be implemented as a processor, circuit, and/or instructions 606 stored in the memory 604 and executed by the processor 602. In some instances, the capability indication module 608 and/or the precoding configuration module 609 can be integrated within the modem subsystem 612. The capability indication module 608 and/or the precoding configuration module 609 can be implemented by a combination of software components (e.g., executed by a DSP or a general processor) and hardware components (e.g., logic gates and circuitry) within the modem subsystem 612. The capability indication module 608 and/or the precoding configuration module 609 may be used for various aspects of the present disclosure, for example, aspects of FIGS. 1, 3, 4, and 7-10.

In some aspects, the capability indication module 608 may be configured to receive an indication of a maximum transmit power capability of a UE from the UE. In some examples, the indication may indicate whether the UE is fully coherent or not fully coherent (e.g., partially coherent or non-coherent). The precoding configuration module 609 may be configured to transmit a transmit precoding configuration based on the UE's maximum transmit power capability to the UE. The transmit precoding configuration may be a TPMI index (e.g., TPMI index in FIG. 3 or in FIG. 4) or a matrix W corresponding to a TPMI index. The transmit precoding configuration may indicate to the UE which antennas to use for transmitting a communication signal.

The precoding configuration module 609 may be configured to receive a communication signal using the transmit precoding configuration.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., grants, resource allocations) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices. The RF unit 614 may correspond to the RF transmit chains included within a transmit chain, as discussed in the present disclosure.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., UCI, DMRS) to the capability indication module 608 or the precoding configuration module 609 for processing. The antennas 616 may include multiple antennas of similar or different designs in order to sustain multiple transmission links.

In an example, the transceiver 610 is configured to receive an indication of a maximum transmit power capability of a UE, transmit a transmit precoding configuration based on the UE's maximum transmit power capability, and/or receive a communication signal using the transmit precoding configuration, by coordinating with the capability indication module 608 and/or the precoding configuration module 609. In some aspects, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
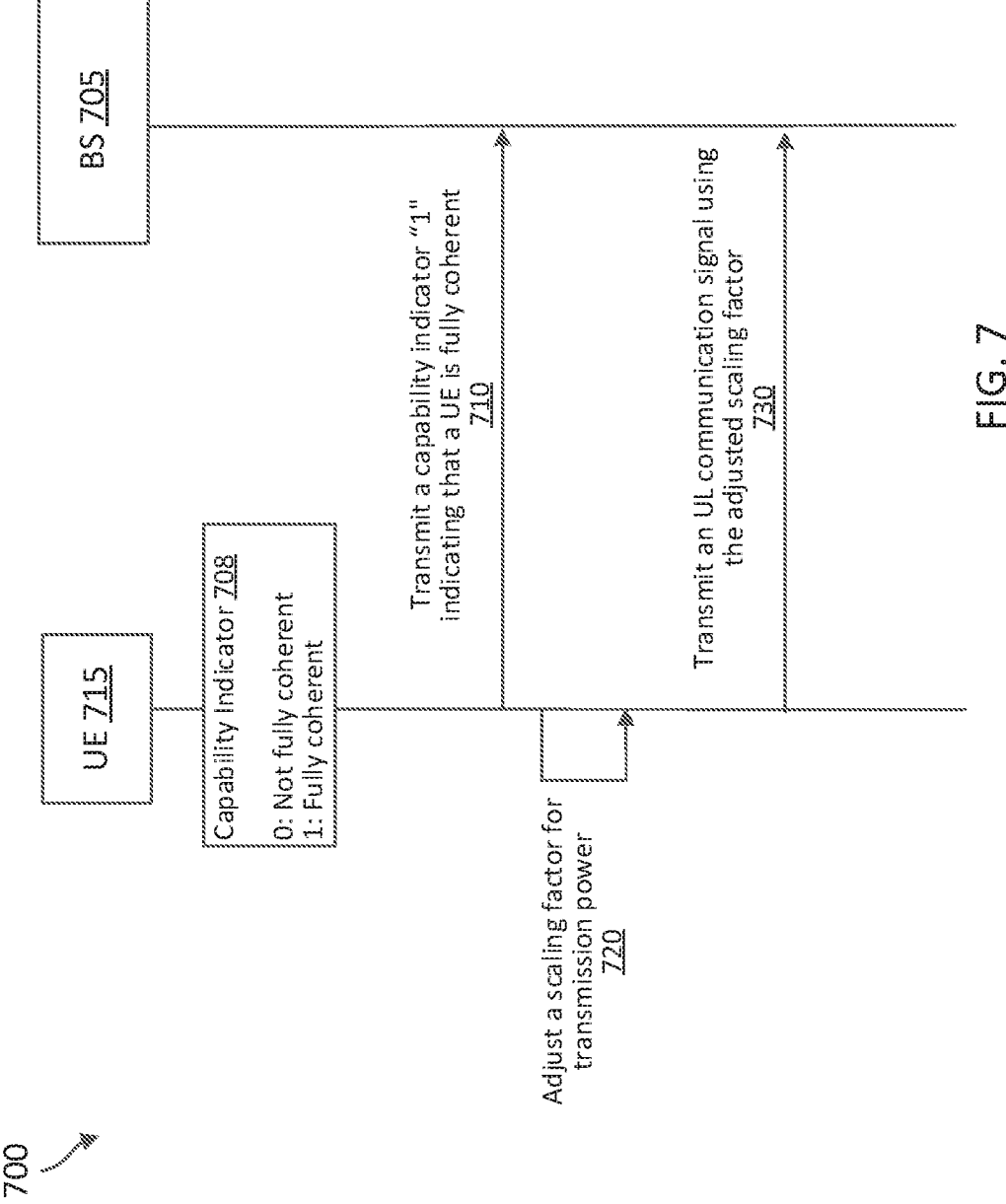
FIG. 7 is a signaling diagram of a capability signaling communication method according to some aspects of the present disclosure.
Figure 8:
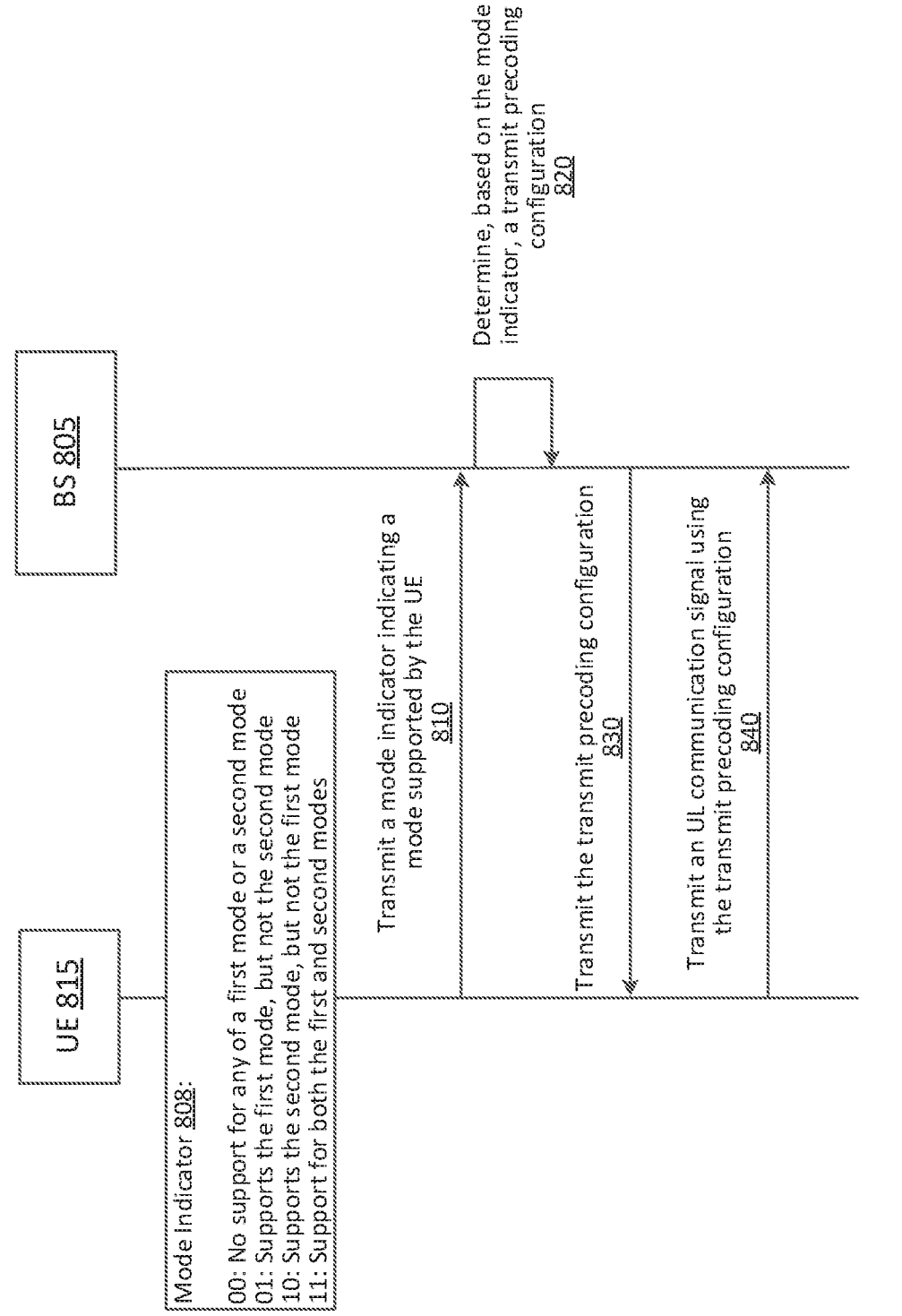
FIG. 8 is a signaling diagram of a capability signaling communication method according to some aspects of the present disclosure.

FIGS. 7 and 8 are signaling diagrams of a capability signaling communication method. In FIGS. 7 and 8, the UE provides full power capability signaling to transmit information about a maximum transmit power capability of the UE and/or to transmit information that enables the UE to transmit at full power. As discussed, a UE having the first level of UE capability may transmit at the maximum transmit power capability by using any of the transmit chains. Additionally, a UE having the second level or third level of UE capability and desiring to transmit at the maximum transmit power capability may be configured to use all or a subset of the transmit chains to do so.

FIG. 7 is a signaling diagram of a capability signaling communication method 700 according to some aspects of the present disclosure. The method 700 may be implemented between a BS 705 and a UE 715 and may employ similar mechanisms as in the methods 900 and/or 1000, described above with respect to FIGS. 9 and 10, respectively. The BS 705 may be similar to the BS 105, 600 and the UE 715 may be similar to the UE 115, 215, 500. Additionally, the BS 705 and the UE 715 may operate in a network such as the network 100. As illustrated, the method 700 includes a number of enumerated steps, but embodiments of the method 700 may include additional steps before, after, and in between the enumerated steps. In some aspects, one or more of the enumerated steps may be omitted or performed in a different order.

The UE 715 may transmit a capability indicator 708 to the BS. The capability indicator 708 may be an indication of a maximum transmit power capability of the UE and in particular, may indicate whether the UE is fully coherent. The capability indicator 708 may be used as a capability signaling mechanism, whereby the UE 715 may describe its capabilities with regard to full power transmission to the BS. In the example illustrated in FIG. 7, the capability indicator 708 is a bit having a value of 0 if the UE is not fully coherent (e.g., the UE is partially coherent or non-coherent) or having a value of 1 if the UE is fully coherent and each transmit chain can transmit at full power. It should be understood that this is not intended to be limiting, and the capability indicator may have different values for indicating whether the UE is fully coherent. Additionally, the capability indicator may be represented in ways other than a bit value (e.g., by more than one bit, by a string variable, etc.).

In the example illustrated in FIG. 7, the UE is fully coherent and each transmit chain is capable of transmitting at full power. At step 710, the UE 715 transmits a capability indicator to the BS, the capability indicator having a bit value "1" indicating that the UE is fully coherent. The BS receives the capability indicator and determines, based on the capability indicator, that the UE 715 is fully coherent.

At step 720, the UE 715 adjusts a scaling factor for transmission power. If the UE 715 is fully coherent, the UE may modify the power control mechanism to support UL full power transmission without precluding the use of full-rate power amplifiers. In some examples, the UE 715 supports full power transmission by setting the power scaling factor in the power control to a first value (e.g., "1") for one or more precoders (e.g., all precoders). In this scenario, it may be unnecessary for the UE to provide additional full power capability signaling for the UE to be able to transmit at full power.

At step 730, the UE 715 transmits an UL communication signal using the adjusted scaling factor. If the UE 715 is a power class 3 UE, the UE 715 may deliver a total power of 23 dBm when transmitting the UL communication signal.

FIG. 8 is a signaling diagram of a capability signaling communication method 800 according to some aspects of the present disclosure. The method 800 may be implemented between a BS 805 and a UE 815 and may employ similar mechanisms as in the methods 900 and/or 1000, described above with respect to FIGS. 9 and 10, respectively. The BS 805 may be similar to the BS 105, 600 and the UE 815 may be similar to the UE 115, 215, 500. Additionally, the BS 805 and the UE 815 may operate in a network such as the network 100. As illustrated, the method 800 includes a number of enumerated steps, but embodiments of the method 800 may include additional steps before, after, and in between the enumerated steps. In some aspects, one or more of the enumerated steps may be omitted or performed in a different order.

In the example illustrated in FIG. 8, the UE is partially coherent or non-coherent. The network may define modes for partially coherent and/or non-coherent UEs to transmit at full power. In some examples, the UE 815 may be configured to support one and/or two modes for full power operation. A first mode supports full power transmission by allowing partially coherent or non-coherent UEs to use full coherent precoders as discussed above in relation to a transmit precoding configuration. A transmit precoding configuration may indicate a set of precoders that the UE may use for UEs having a certain level of UE capability (e.g., the second or third level). The BS may transmit an explicit signal requesting the UE 815 to transmit at full power by using all available transmit chains. For example, the BS may transmit a transmit precoding configuration by indicating precoders that have non-zero entries that point to each antenna element. To enable full power transmission, the transmit precoding configuration may configure the partially coherent or non-coherent UE to transmit on all antenna elements.

If the UE supports the first mode, the BS may signal to the UE that it may use a precoder of the form:

$$\begin{bmatrix} 1 \\ 1 \end{bmatrix} \text{ or } \begin{bmatrix} 1 \\ x \end{bmatrix}.$$

The UE may use additional precoders to enable transmission across multiple transmit chains. For example, for single-layer transmission using four antenna ports with transform precoding disabled, a UE that supports the first mode may use the precoders indicated by the TPMI indexes 0-15 in FIG. 3 or indicated by the TPMI indexes 0-19 in FIG. 4. The partially coherent or non-coherent UEs may transmit a communication signal using the transmit precoding configuration via a transparent small-cycle delay diversity (S-CDD) implementation. For example, the UE may apply a small-cyclic delay to support the precoder $$\begin{bmatrix} 1 \\ 1 \end{bmatrix} \text{ or } \begin{bmatrix} 1 \\ x \end{bmatrix},$$

where x can be 1, −1, j, −j. Referring back to FIG. 2, the UE may apply the small-cyclic delay in the baseband 240.

A second mode supports full power transmission by allowing the UE to transmit UL communications via a set of virtual ports. A virtual port may represent a combination of multiple antenna elements (e.g., mix-and-match combinations) to the BS 805. The UE may select a combination of RF chains that enable the UE to transmit at full power and virtualize an SRS port based on the combination of RF chains. The UE may synthesize the virtual port and use it to transmit at full power. For example, in FIG. 2, the UE 215 may synthesize a virtual port by transmitting a signal using a combination of the power amplifiers 220 and 224. The UE may sound the antenna element(s) and virtual port(s) using SRS transmission so that the BS knows that the UE will use this virtual port for delivery of maximum power transmission. Full power PUSCH port(s) is virtualized in the same way as virtualized SRS port(s).

The BS 805 may receive the communication signal and may determine that the virtual port is capable of full power transmission. Accordingly, the BS 805 may configure the UE 815 to use the virtual port to transmit PUSCH.

At step 810, the UE 815 transmits a mode indicator 808 to the BS. The mode indicator 808 may be an indication of a maximum transmit power capability of the UE and in particular, may indicate one or more modes supported by the UE 815. The mode indicator 808 may be "00" if the UE does not support any one of the first or the second mode; the mode indicator 808 may be "01" if the UE supports the first mode, but not the second mode; the mode indicator 808 may be "10" if the UE supports the second mode, but not the first mode; and the mode indicator 808 may be "11" if the UE supports both the first and the second modes.

The BS receives the mode indicator 808 and may determine how to configure the UE for full power transmission. At step 820, the BS determines, based on the mode indicator 808, a transmit precoding configuration. The BS determines, based on the mode indicator, that the UE 815 is not fully coherent and additionally what mode(s) the UE 815 supports. The transmit precoding configuration may be based on the UE's maximum transmit power capability. The BS may determine the transmit precoding configuration in accordance with a codebook.

In some aspects, the mode indicator 808 indicates that the UE does not support any one of the first mode or the second mode. In this scenario, it may be unnecessary for the UE to provide additional full power capability signaling because the UE may reference a codebook and transmit a communication signal using the codebook to the BS.

In some aspects, the mode indicator 808 indicates that the UE supports the first mode, but not the second mode. In this scenario, it may be unnecessary for the UE to provide additional full power capability signaling because the UE may receive a transmit precoding configuration from the BS and transmit a communication signal using the transmit precoding configuration. If the UE 815 is partially coherent, supports the first mode, and has four antenna ports with transform precoding disabled, the BS 805 may configure the UE to use a codebook subset including at least rank 1, with TPMI index 12, 13, 14, or 15 (as shown in FIG. 3) for UL full power transmission. If the UE 815 is partially coherent, supports the first mode, and has four antenna ports with transform precoding enabled, the BS 805 may configure the UE to use a codebook subset including at least rank 1, with TPMI index 12, 13, 14, 15, 16, 17, 18, or 19 (as shown in FIG. 4) for UL full power transmission.

In some aspects, the mode indicator 808 indicates that the UE supports the second mode, but not the first mode. In this example, the UE may provide additional full power capability signaling. The BS may be aware that the UE transmitted the UL communication signal using the virtual port, but not know which transmit chains the UE used in the UL transmission.

The additional full power capability signaling may be per-feature set per-CC (e.g., per CC per-band per-band combination). The UE may provide the additionally full power capability signaling bits on a per-carrier basis. In some examples, the UE full power capability signaling is per feature set per-CC per-band per-band combination. The UE may operate in the n78 and n79 bands, the n78 band being 500 MHz wide, and the n79 band being 600 MHz wide. Additionally, the n78 band may have five CCs of 100 MHz within it (e.g., n78a, n78b, n78c, n78d, and n78e), and the n79 band may have six CCs of 100 MHz within it (e.g., n79a, n79b, n79c, n79d, n79e, and n79f). If the UE indicates support for the band combination n78 and n79, the BS may schedule UL carriers on band combination n78 and n79. The UE may configure different transmit chain settings or may utilize different chains (e.g., power amplifier) for different CCs and/or different bands, and the UE may communicate capability information at this granularity level. Multiple power amplifiers may support different parts of the same band. In this scenario, the UE may specify the capabilities on a per-CC basis because each CC is powered by different power amplifiers. The UE may specify the full power capability for each of the 11 CCs above. The power amplifier capability may vary. If the power amplifier capability varies on a per-CC basis, then the UE may transmit an indication of a maximum transmit power capability of the UE on a per-CC basis. The maximum transmit power capability of the UE may change from one CC to another CC. If the power amplifier capability varies on a per-band basis, then the UE may transmit an indication of a maximum transmit power capability of the UE on a per-band basis.

In some aspects, the mode indicator 808 indicates that the UE supports both the first mode and the second mode. In this example, the UE may provide additional full power capability signaling. The additional full power capability signaling may be per feature set per CC (e.g., per CC per band per band combination).

At step 830, the BS transmits the transmit precoding configuration to the UE. The UE receives the transmit precoding configuration.

At step 840, the UE 815 transmits an UL communication signal using the transmit precoding configuration. If the UE 815 is a power class 3 UE, the UE 815 may deliver a total power of 23 dBm when transmitting the UL communication signal.

Figure 9:
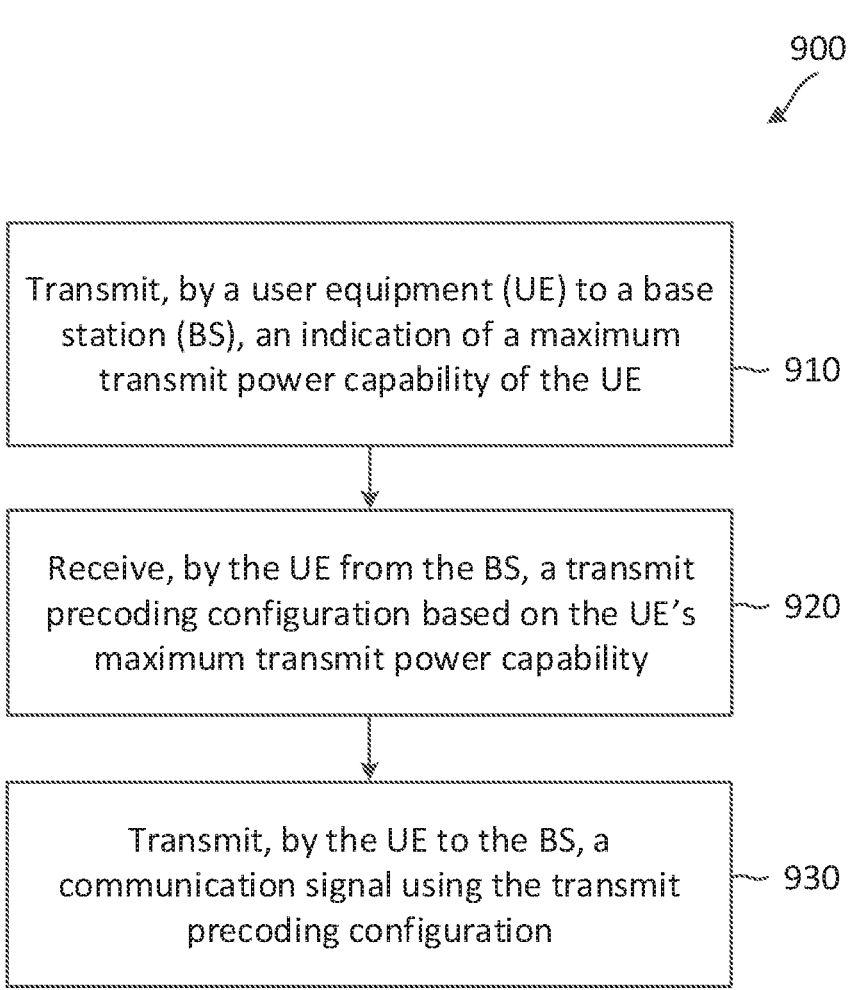
FIG. 9 is a flow diagram of a communication method according to some aspects of the present disclosure.

FIG. 9 is a flow diagram of a communication method 900 according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the UE 115, UE 215, UE 500, UE 715, and/or UE 815 may utilize one or more components, such as the processor 502, the memory 504, the capability indication module 508, the precoding configuration module 509, the transceiver 510, the modem 512, and the one or more antennas 516, to execute the steps of method 900. The method 900 may employ similar mechanisms as in the methods 700 and/or 800 described above with respect to FIGS. 7 and 8, respectively. As illustrated, the method 900 includes a number of enumerated steps, but aspects of the method 900 may include additional steps before, after, and in between the enumerated steps. In some aspects, one or more of the enumerated steps may be omitted or performed in a different order.

At step 910, the method 900 includes transmitting, by a UE to a BS, an indication of a maximum transmit power capability of the UE. The indication include a capability indicator and/or mode indicator, as discussed in the present disclosure.

At step 920, the method 900 includes receiving, by the UE from the BS, a transmit precoding configuration based on the UE's maximum transmit power capability.

At step 930, the method 900 includes transmitting, by the UE to the BS, a communication signal using the transmit precoding configuration.

The UE capable signaling for full power may follow a hierarchy structure. In some examples, the top level signaling may include a single bit to signal that the UE can support full power with all precoders. In this example, the signaling may be sufficient for the UE that is capable of transmitting at full power and it may be unnecessary to transmit more additional lower level signaling for full power capability. In some examples, a UE that is unable to support full power with all precoders may transmit additional signals indicating whether the UE can support the first mode and/or the second mode. In an example, if the UE supports the first mode, but not the second mode, it may be unnecessary for the UE to transmit additional capability signaling. The UE may transmit at full power with a first codebook subset while full power cannot be guaranteed with a second codebook subset. In an example, if the UE supports the second mode, further capability signaling per TPMI group may be introduced.

In some examples, a single bit (e.g., level 1) is used to indicate that a UE supports full power by setting power scaling factor in power control equals to one for all precoders. The UE full power capability signaling may be indicated per-feature set per-CC per band and/or per-band combination.

Figure 10:
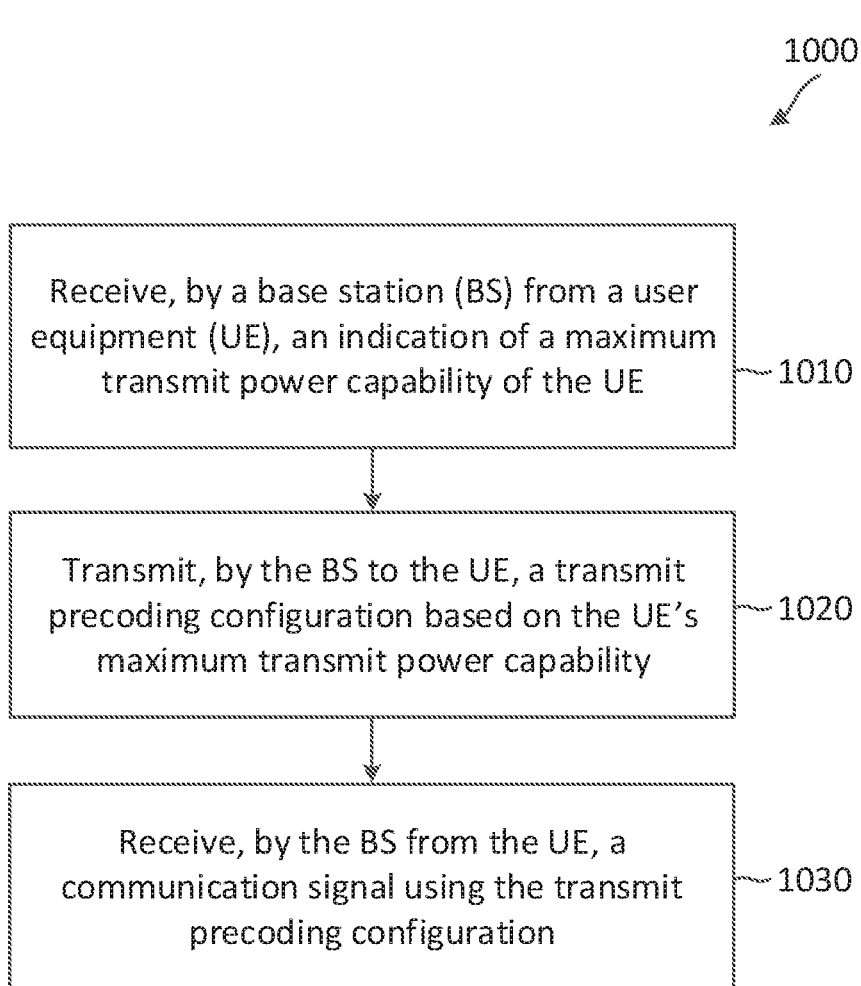
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the BS 105, BS 600, BS 705, and/or BS 805 may utilize one or more components, such as the processor 602, the memory 604, the capability indication module 608, the precoding configuration module 609, the transceiver 610, the modem 612, and the one or more antennas 616, to execute the steps of method 1000. The method 1000 may employ similar mechanisms as in the methods 700 and/or 800 described above with respect to FIGS. 7 and 8, respectively. As illustrated, the method 1000 includes a number of enumerated steps, but aspects of the method 1000 may include additional steps before, after, and in between the enumerated steps. In some aspects, one or more of the enumerated steps may be omitted or performed in a different order.

At step 1010, the method 1000 includes receiving, by a BS from a UE, an indication of a maximum transmit power capability of the UE.

At step 1020, the method 1000 includes transmitting, by the BS to the UE, a transmit precoding configuration based on the UE's maximum transmit power capability.

At step 1030, the method 1000 includes receiving, by the BS from the UE, a communication signal using the transmit precoding configuration.

In some aspects, a computer-readable medium includes program code recorded thereon. The program code can include code for causing a UE to transmit, to a BS, an indication of a maximum transmit power capability of the UE. The program code may further include code for causing the UE to receive a transmit precoding configuration based on the maximum transmit power capability of the UE. The program code may also include code for causing the UE to transmit, to the BS, a communication signal with a power level based on the transmit precoding configuration.

In some aspects, a computer-readable medium includes program code recorded thereon. The program code can include code for causing a BS to receive, from a UE, an indication of a maximum transmit power capability of the UE. The program code may further include code for causing the BS to transmit a transmit precoding configuration based on the UE's maximum transmit power capability. Further, the program code may include code for causing the BS receive from the UE, a communication signal with a power level based on the transmit precoding configuration.

In some aspects, an apparatus, such as a UE, includes means for transmitting, to a BS, an indication of a maximum transmit power capability of a UE. The apparatus may further include means for receiving, from the BS, a transmit precoding configuration based on the UE's maximum transmit power capability. The apparatus can also include means for transmitting, to the BS, a communication signal with a power level based on the transmit precoding configuration.

In some aspects, an apparatus, such as a BS, can include means for receiving, from a UE, an indication of a maximum transmit power capability of the UE. The apparatus may further include means for transmitting, to the UE, a transmit precoding configuration based on the UE's maximum transmit power capability. Further, the apparatus may include means for receiving, from the UE, a communication signal with a power level based on the transmit precoding configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed at a user equipment (UE), the method comprising:
transmitting, to network node, an indication including:
a single value, including at least a bit value, indicating whether the UE supports full transmit power capability across all bands supported by the UE, and
a mode indicator, different from the single value, indicating that the UE supports:
a first mode only, the first mode being associated with the UE supporting full power transmission using full coherent precoders,
a second mode only, the second mode associated with the UE supporting full power transmission using a virtual port, or
both the first mode and the second mode;
receiving, from the network node, a transmit precoding matrix indicator (TPMI) index based on the indication; and
transmitting, to the network node, a communication signal with a power level based on the TPMI index via a delay applied to a baseband signal with transform precoding disabled.

2. The method of claim 1,
wherein the TPMI index indicates a codebook subset for uplink full power transmission corresponding to at least one of the first mode or the second mode.

3. The method of claim 1,
wherein the transmitting the communication signal comprises transmitting the communication signal using at least one pair of antenna elements that are non-coherent or using the virtual port.

4. The method of claim 1,
wherein the mode indicator indicates that the UE supports the second mode only or both the first mode and the second mode, and
wherein transmitting the communication signal comprises transmitting the communication signal at a full transmit power using the virtual port.

5. The method of claim 1,
wherein each component carrier (CC) has an associated power amplifier, and
wherein transmitting the indication comprises transmitting the indication on a per-CC basis.

6. The method of claim 4,
the method further comprising:
determining the virtual port is scheduled for a physical uplink shared channel (PUSCH).

7. The method of claim 1,
wherein the transmitting the indication comprises transmitting the indication via a physical uplink control channel (PUCCH) communication.

8. The method of claim 1,
wherein the mode indicator indicates that the UE supports the second mode only or both the first mode or the second mode, and
the method further comprising:
transmitting a refinement indication indicating whether the UE is capable of synthesizing one virtual port or two virtual ports that independently support full power transmission.

9. A user equipment (UE), comprising:

at least one memory; and at least one processor, coupled to the at least one memory, configured to:

transmit, to a network node, an indication including:

a single value, including at least a bit value, indicating whether the UE supports full transmit power capability across all bands supported by the UE, and a mode indicator, different from the single value, indicating that the UE supports:

a first mode only, the first mode being associated with the UE supporting full power transmission using full coherent precoders, a second node only, the second mode associated with the UE supporting full power transmission using a virtual port, or both the first mode and the second mode;

receive, from the network node, a transmit precoding matrix indicator (TPMI) index based on the indication; and transmit, to the network node, a communication signal with a power level based on the TPMI index via a delay applied to a baseband signal with transform precoding disabled.

10. The UE of claim 9, wherein the TPMI index indicates a codebook subset for uplink full power transmission corresponding to at least one of the first mode or the second mode.

11. The UE of claim 9, wherein, to transmit the communication signal, the at least one processor is configured to transmit the communication signal using at least one pair of antenna elements that are non-coherent or using the virtual port.

12. The UE of claim 9, wherein the mode indicator indicates that the UE supports the second mode only or both the first mode and the second mode, and wherein, to transmit the communication signal, the at least one processor is configured to transmit the communication signal at a full transmit power using the virtual port.

13. The UE of claim 9, wherein, to transmit the indication, the at least one processor is configured to transmit the indication via a physical uplink control channel (PUCCH) communication.

14. The UE of claim 9, wherein the mode indicator indicates that the UE supports the second mode only or both the first mode or the second mode, and wherein the at least one processor is configured to:

transmit a refinement indication indicating whether the UE is capable of synthesizing one virtual port or two virtual ports that independently support full power transmission.

15. A method of wireless communication performed at a network node, the method comprising:

receiving, from a user equipment (UE), an indication including:

a single value, including at least a bit value, indicating whether the UE supports full transmit power capability across all bands supported by the UE, and a mode indicator, different from the single value, indicating that the UE supports:

a first mode only, the first mode being associated with the UE supporting full power transmission using full coherent precoders, a second mode only, the second mode associated with the UE supporting full power transmission using a virtual port, or both the first mode and the second mode;

transmitting, to the UE, a transmit precoding matrix indicator (TPMI) index based on the indication; and receiving, from the UE, a communication signal with a power level based on the TPMI index via a delay applied to a baseband signal with transform precoding disabled.

16. The method of claim 15, wherein the TPMI index indicates a codebook subset for uplink full power transmission corresponding to at least one of the first mode or the second mode.

17. The method of claim 15, wherein the mode indicator indicates that the UE supports the second mode only or both the first mode and the second mode, and wherein receiving the communication signal comprises receiving the communication signal from the virtual port of the UE at a full transmit power.

18. The method of claim 17, the method further comprising:

scheduling the virtual port for a physical uplink shared channel (PUSCH).

19. The method of claim 15, wherein the mode indicator indicates that the UE supports the second mode only or both the first mode or the second mode, and the method further comprising:

receiving a refinement indication indicating whether the UE is capable of synthesizing one virtual port or two virtual ports that independently support full power transmission.

20. A network node, comprising:

at least one memory; and at least one processor, coupled to the at least one memory, configured to:

receive, from a user equipment (UE), an indication including:

a single value, including at least a bit value, indicating whether the UE supports full transmit power capability across all bands supported by the UE, and a mode indicator, different from the single value, indicating that the UE supports:

a first mode only, the first mode being associated with the UE supporting full power transmission using full coherent precoders, a second mode only, the second mode associated with the UE supporting full power transmission using a virtual port, or both the first mode and the second mode;

transmit, to the UE, a transmit precoding matrix indicator (TPMI) index based on the indication; and receive, from the UE, a communication signal with a power level based on the TPMI index via a delay applied to a baseband signal with transform precoding disabled.

21. The network node of claim 20, wherein the TPMI index indicates a codebook subset for uplink full power transmission corresponding to at least one of the first mode or the second mode.

22. The network node of claim 20, wherein the mode indicator indicates that the UE supports the second mode only or both the first mode and the second mode, and wherein, to receive the communication signal, the at least one processor is configured to receive the communication signal from the virtual port of the UE at a full transmit power.

23. The network node of claim 20, wherein, to receive the indication, the at least one processor is configured to receive the indication via a physical uplink control channel (PUCCH) communication.

24. The network node of claim 20, wherein the mode indicator indicates that the UE supports the second mode only or both the first mode or the second mode, and wherein the at least one processor is configured to:

receive a refinement indication indicating whether the UE is capable of synthesizing one virtual port or two virtual ports that independently support full power transmission.

\* \* \* \* \*